Figure 1:
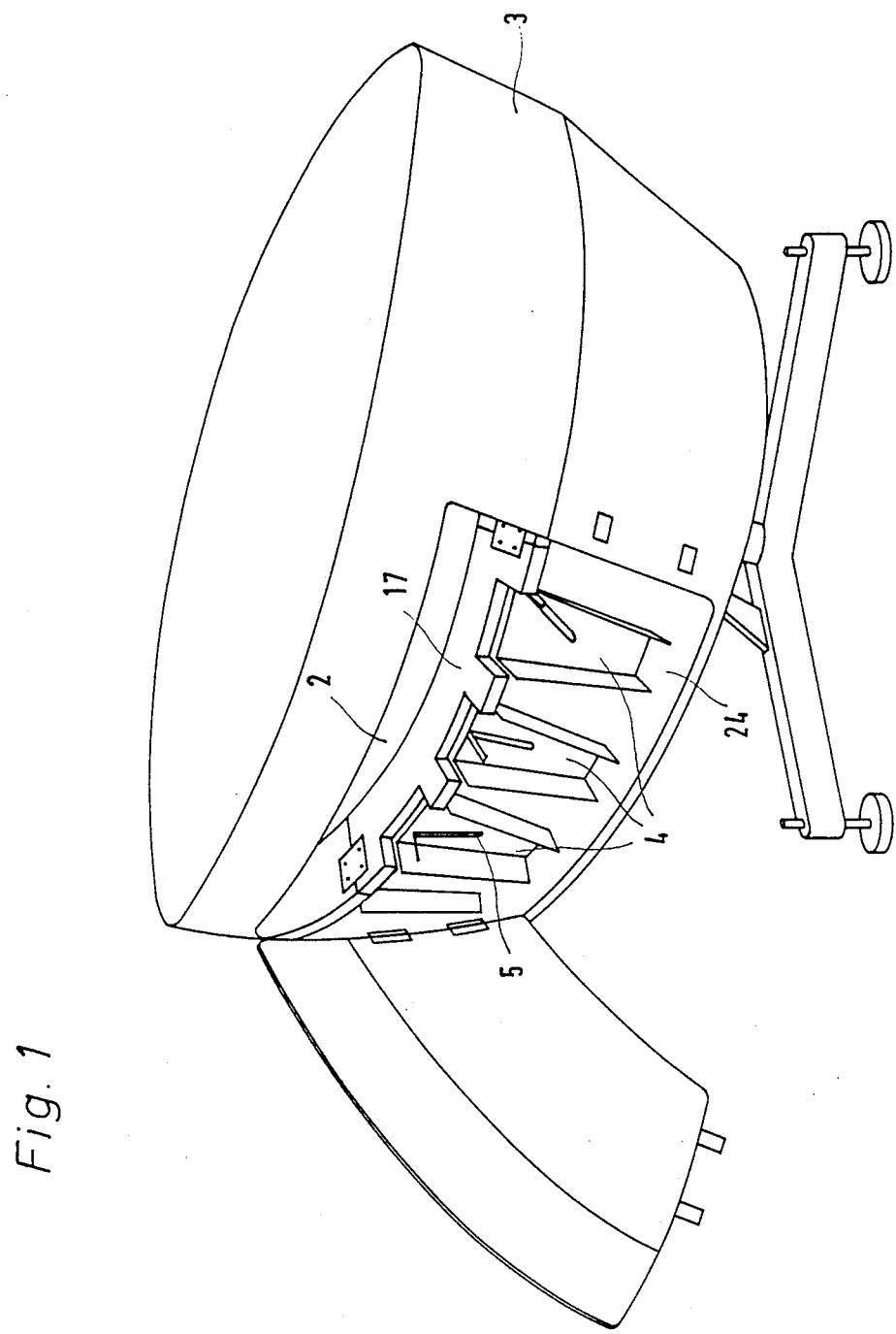

United States Patent [19]

Schindel

[11] Patent Number: 4,949,834

[45] Date of Patent: Aug. 21, 1990

[54] APPARATUS FOR RIGHTING SHAPED PARTS IN ARRAY

[76] Inventor: Hugo Schindel, Obersaulheimer Strasse 64 6501, Saulheim, Fed. Rep. of Germany

[21] Appl. No.: 308,737

[22] Filed: Feb. 9, 1989

[30] Foreign Application Priority Data

Feb. 9, 1989 [DE] Fed. Rep. of Germany ....... 3803852

[51] Int. Cl.[5] ............................................ B65G 47/24
[52] U.S. Cl. .................................... 198/392; 198/395; 198/400; 198/397
[58] Field of Search ............... 198/383, 388, 389, 390, 198/392, 395, 401, 400, 397; 221/171, 172

[56] References Cited

U.S. PATENT DOCUMENTS

| | | | |
|---|---|---|---|
| 3,295,659 | 1/1967 | Aidlin | 198/397 |
| 3,543,909 | 12/1970 | Ueda | 198/392 |
| 3,650,368 | 3/1972 | Nalbach | 198/397 |
| 3,948,386 | 4/1976 | Nalbach | 198/400 X |
| 4,130,194 | 12/1978 | Schindel et al. | 198/397 |
| 4,154,329 | 5/1979 | Hildenbrand | 198/392 |
| 4,798,277 | 1/1989 | Dubuit et al. | 198/400 X |
| 4,825,995 | 5/1989 | Nalbach | 198/392 X |

FOREIGN PATENT DOCUMENTS 2651495 5/1978 Fed. Rep. of Germany .
52-73464 6/1977 Japan .................... 198/400

Primary Examiner—Robert J. Spar
Assistant Examiner—D. Glenn Dayoan
Attorney, Agent, or Firm—Kinzer, Plyer, Dorn, McEachran & Jambor

[57] ABSTRACT

The apparatus serves for the righting and arraying of oblong shaped parts from a reclining into a standing position with a filling opening lying above and following transfer to a transport device. It has a circular turntable, the shaft of which is set obliquely to the vertical, there being provided around the turntable a cylindrical housing open at the top, which is cylindrical under the turntable. About the turntable there are arranged ring segments which present individual downward-converting fall shafts, there being provided above the fall shafts reclining spaces provided with levers for orienting the reclining parts to an upright position. The reclining spaces extend tangentially to the turntable perimeter, made in the outer border of the ring segment and are blocked off by a fixed floor arranged in the zone of the passage openings, which floor is briefly interrupted in the vicinity of the uppermost point of the revolution path of the border of the ring segments for the dropping-through of the shaped part. The levers or baffle plates are swingable, the position of which is controllable in dependence on the position of the shaped part by means of an optical or electronic arrangement.

3 Claims, 10 Drawing Sheets

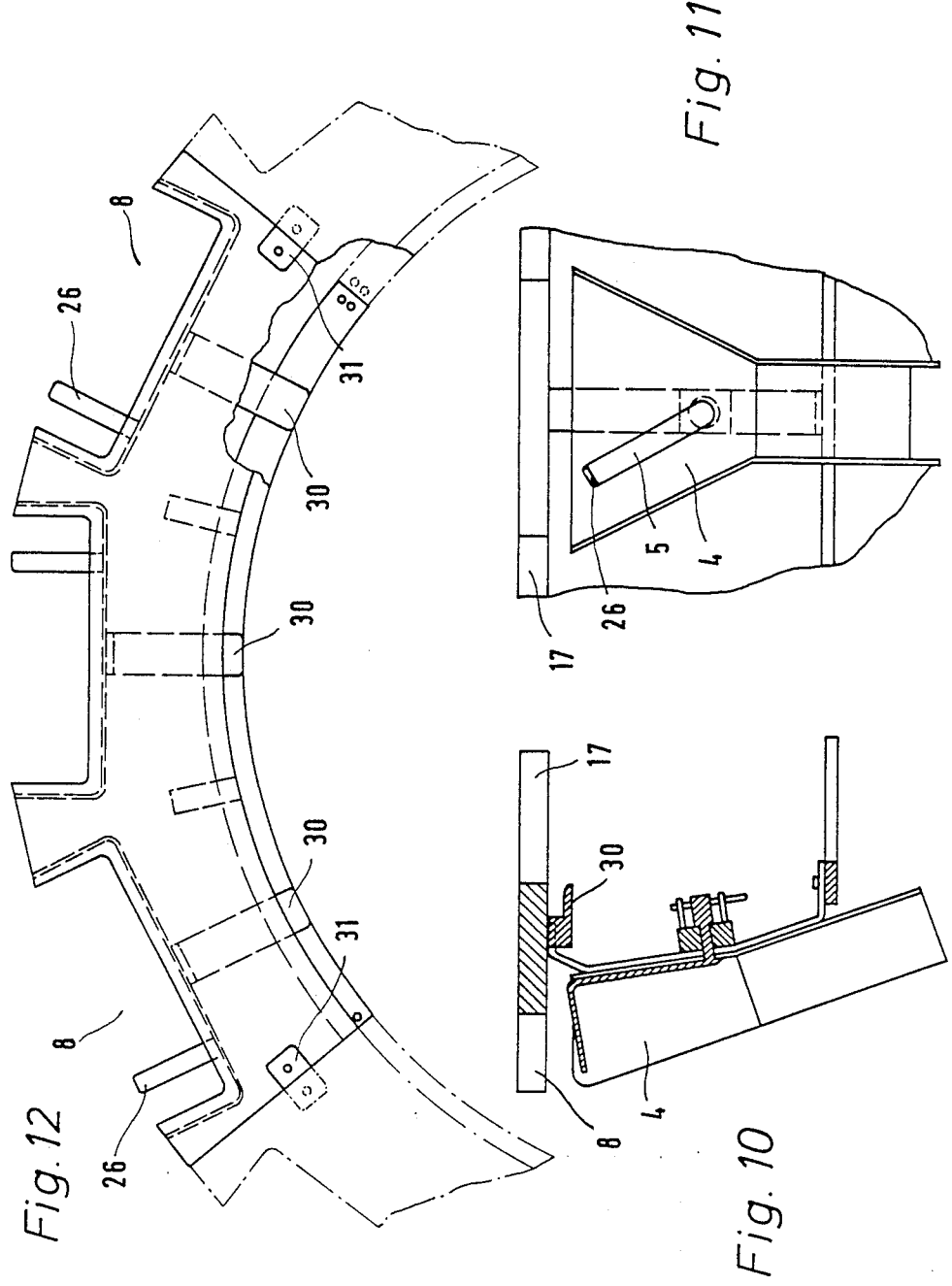

APPARATUS FOR RIGHTING SHAPED PARTS IN ARRAY

The invention relates to an apparatus for righting and arraying oblong bottles, cans, shaped parts or the like of various forms and sizes into a standing position with filling opening lying above, and following transfer to a transport device with a circular turntable the shaft of which is set obliquely to the vertical, in which there is provided a housing open at the top around the turntable, which is constructed cylindrical or funnel-shaped under the turntable, that in the border zone of the turntable there are arranged individual fall shafts converging downward and over the fall shafts there are provided reclining places provided with baffle plates for the shaped parts, that the reclining places are passage openings runing tangentially to the border, made in the outer border of the turntable, and the reclining places are blocked off against the fall shafts by a fixed floor arranged in the zone of the passage openings on the housing, which floor is briefly interrupted in the vicinity of the upper most point of the revolution path of the border of the turntable for the dropping through of a shaped part.

An apparatus with these features is known (German patent 2,651,495), in which the passage openings made in the border of the turntable are adapted as reclining places for the shaped parts in about the length of these shaped parts. The shaped part must be arranged there in its reclining place in such a way that it passes with its filling opening—in the case of a bottle body this is the neck of the bottle—directed upward. In the case of cups or cans open to one side, corresponding molding pieces must be arranged on the border of the passage opening, in which case, further, in the shaft there are additionally mounted supplementary tilting parts, in order to guide the shaped part into the fall shaft in the correct position. The substantial disadvantage of this construction of the reclining places for the shaped parts lies in that for the majority of shaped parts to be processed the ring segments containing the reclining places at the circumference of the turntable have to be changed. This changing is time-consuming and expensive and a large number of such ring segments must be kept in stock. A further substantial disadvantage lies in that the closely fitted passage openings of the reclining places render difficult an optimal occupation in the turning turntable, since a shaped part is not transported by each reclining place of the turntable rotating at the highest possible turning speed. The deformed shaped parts and also poorly falling shaped parts can get stuck in the passage through the narrow opening, which can lead to misfunctionings. Because of the sparse occupation of the shafts higher turning rates must be run, which again has a disadvantageous effect on the bottle transfer from the shafts to the conveyor belt.

Underlying the invention is the problem of constructing a device of the type mentioned at the outset in such a way that the passage opening can be made so large that, without changing of the ring segments, a large number of forms can be processed and special baffle plates can be dispensed with in the process.

The problem is solved according to the invention by the means that as baffle plates in the zone of the passage openings there are provided swingable or shiftable floors or overlays, the position of which is controllable in dependence on the position of the shaped parts by means of an optical or electronic arrangement.

An advantageous form of execution consists in that, on the shaft of the side of the fall shaft facing the turntable there is borne as baffle plate a lever extending into the passage opening, which is swingable into the one end position by means of a fixed stop roll and into the other end position by means of a controllable stop roll, in which system the controllable stop roll is disposed on the outside in the zone of the optical or electronic arrangement as seen in running direction. Further, it is advantageous that the lever is borne on the back wall of the fall shaft and that on the projecting pivot axis there is arranged a pin running transversely thereto, which comes into engagement on stops for the limiting of the privoting movement. It is further advantageous that as baffle plates there are arranged floors divided in the middle of the opening or retractable floors or bolts arranged in the passage opening.

Finally it is advantageous that for the movement control of the floors or bolts there are provided pneumatic or electro-mechanical drives or a mechanical deflector setting.

The invention offers the substantial advantage that with a certain size of the passage opening and therewith also of the reclining place for the shaped parts there can be processed a certain number of different sizes, without its being necessary here for the segments to the changed. There is yielded the further advantage that the reclining places arranged in the border of the turntable are utilized by an optimal occupation, so that the turntable can be driven at a favorable speed. Therewith there is yielded also an especially gentle treatment of the shaped parts.

The invention is explained in detail in the following description with the aide of an example of execution represented in the drawings.

Figure 2:
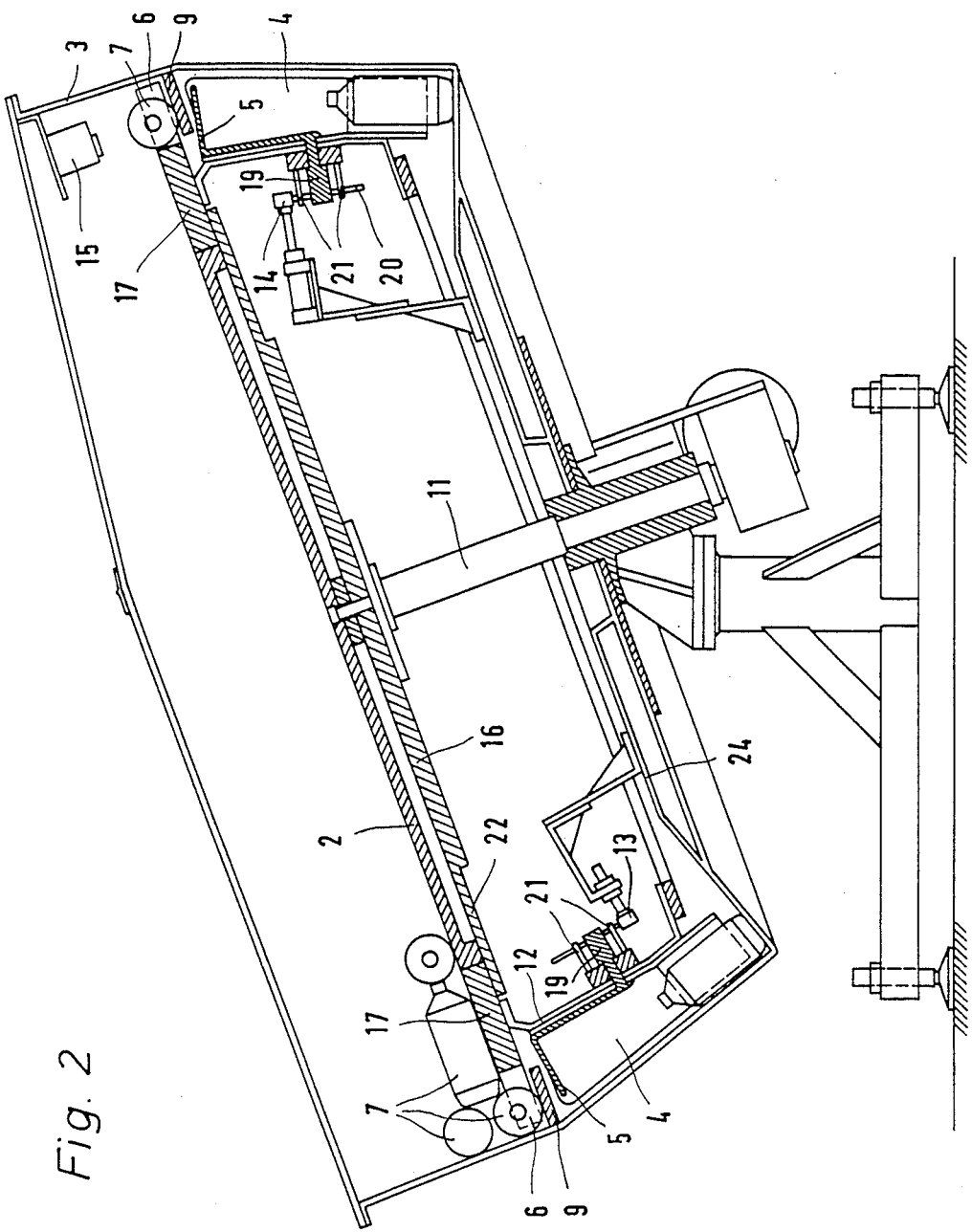
Figure 3:
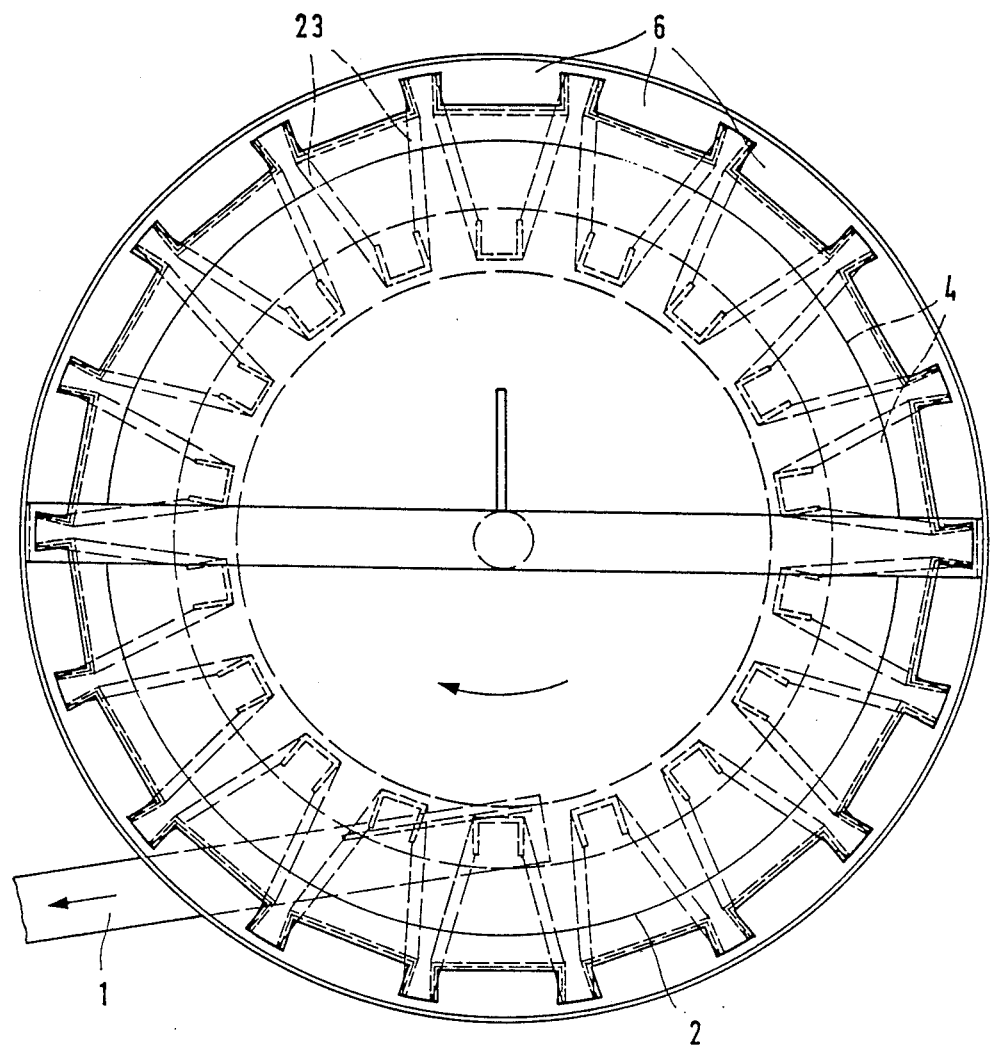
Figure 4:
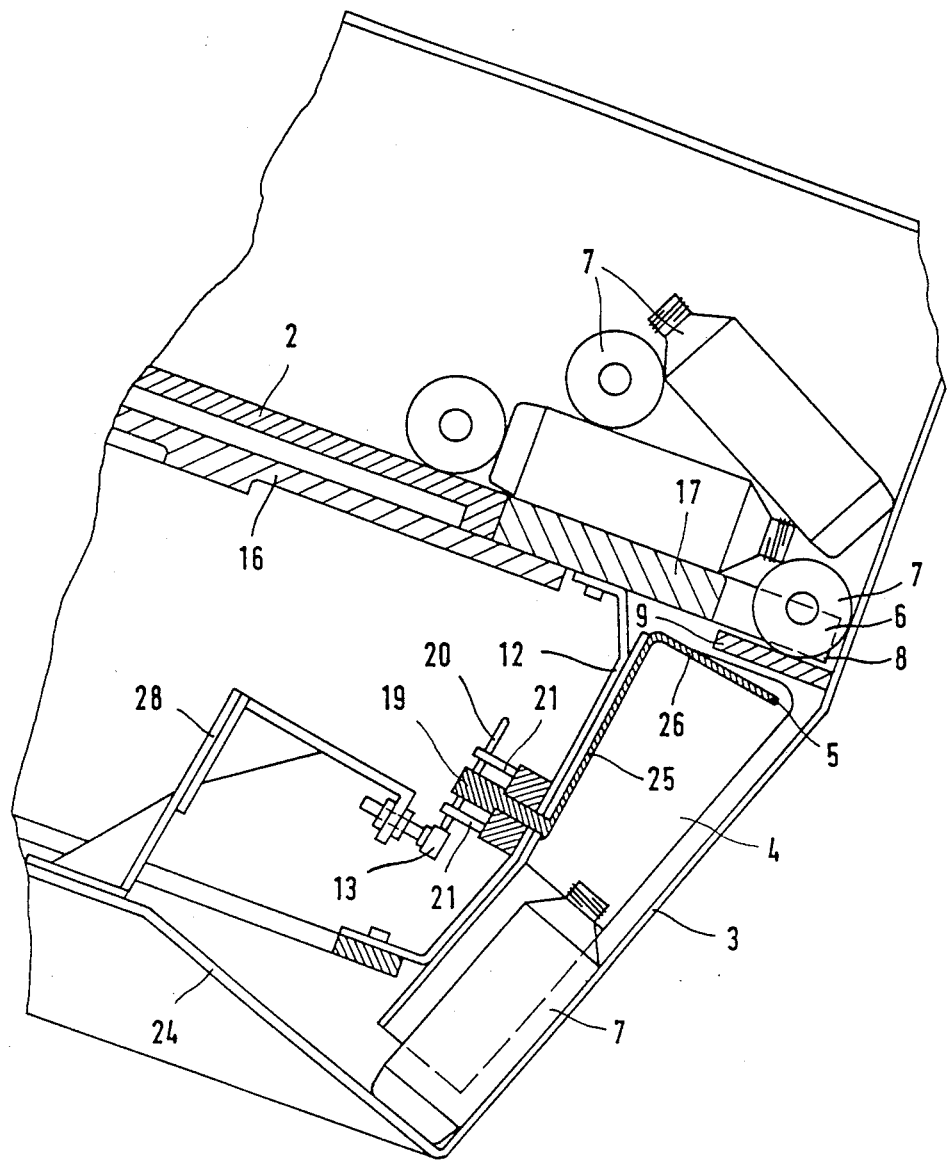
Figure 5:
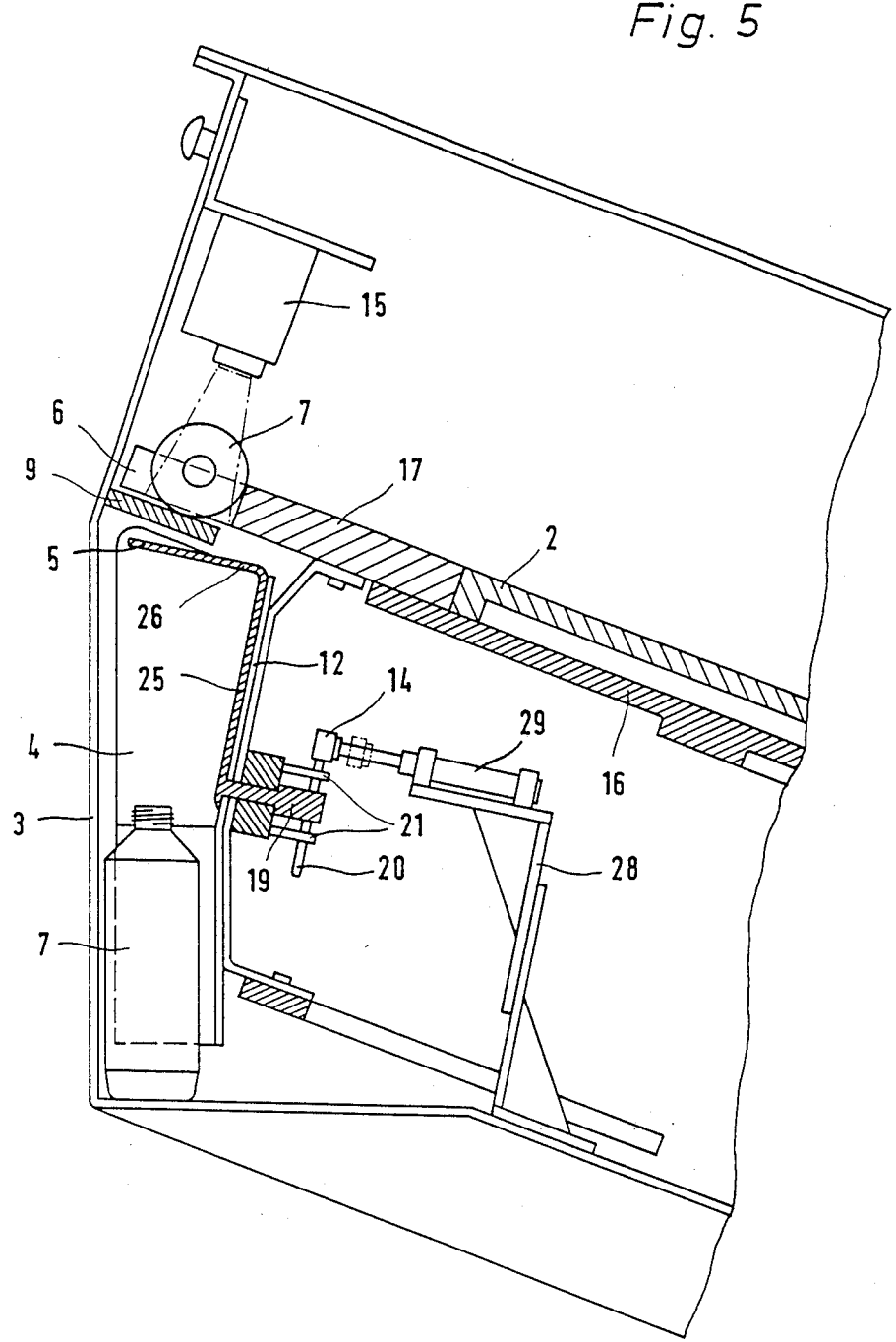
Figure 6:
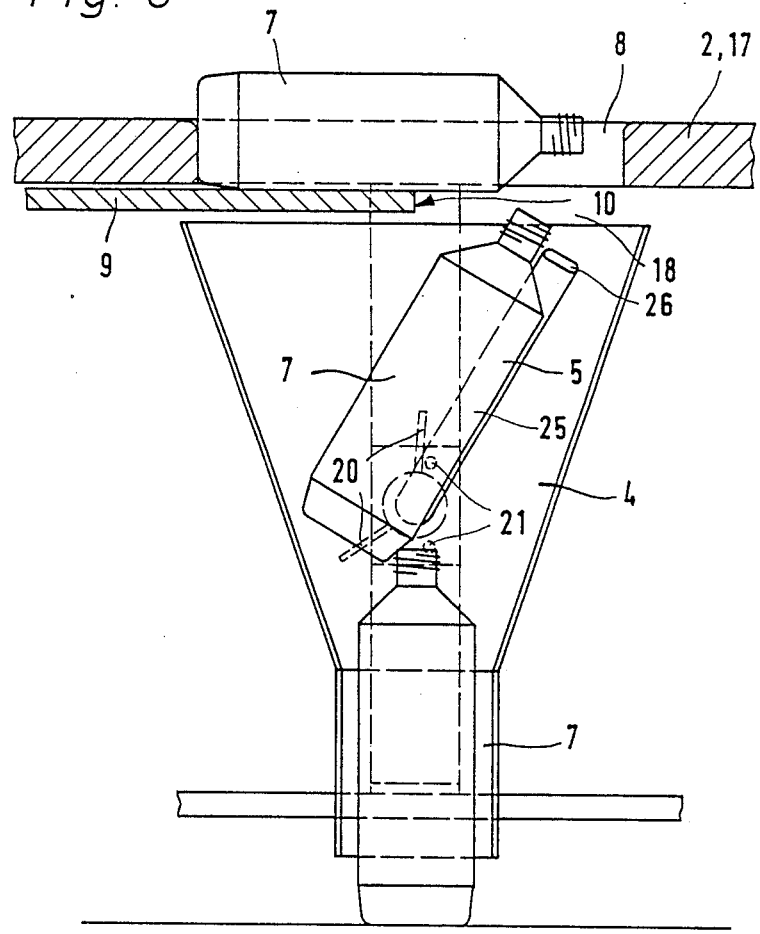
Figure 7:
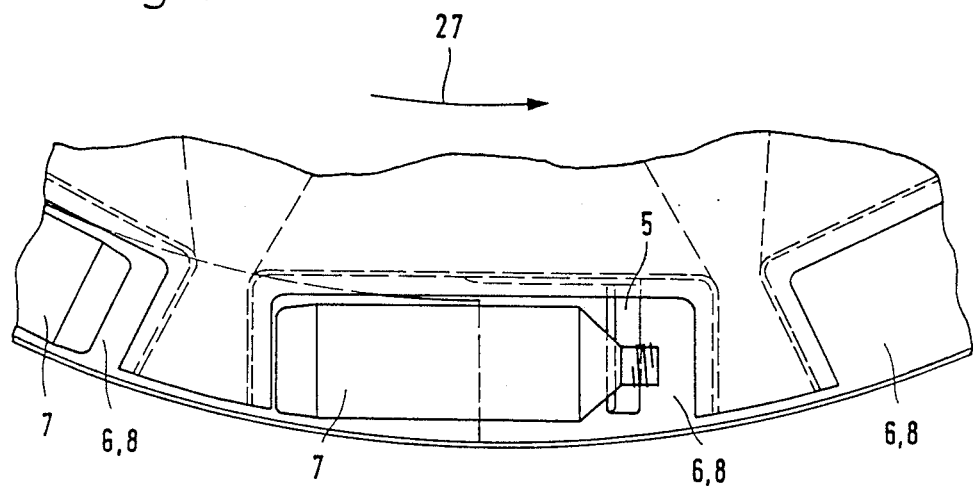
Figure 8:
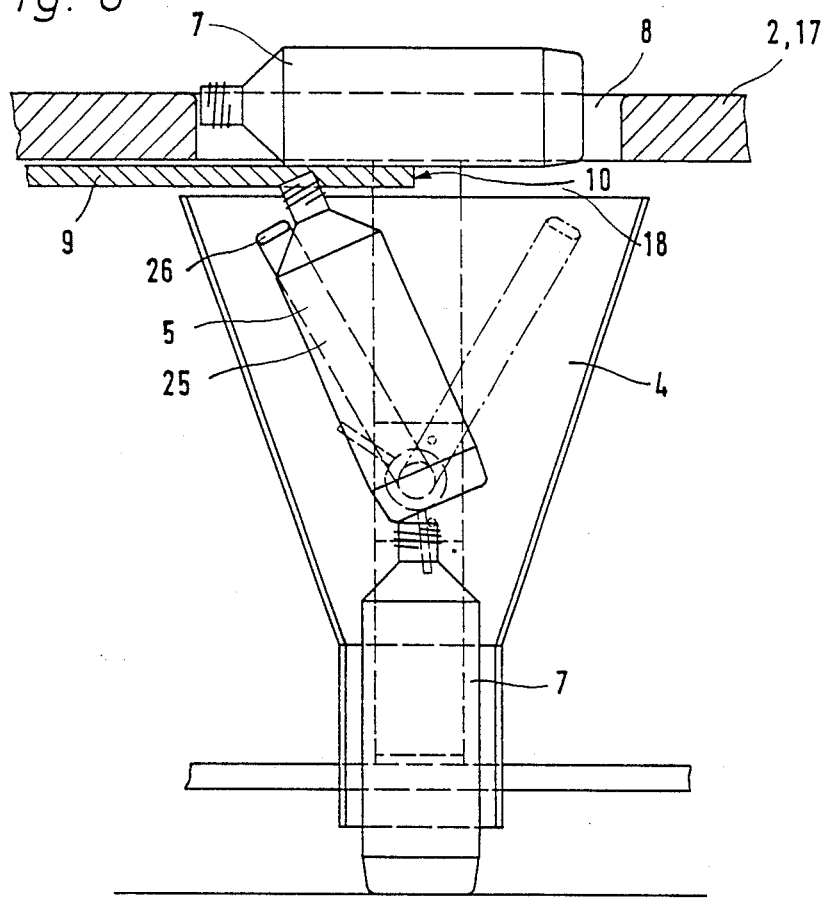
Figure 9:
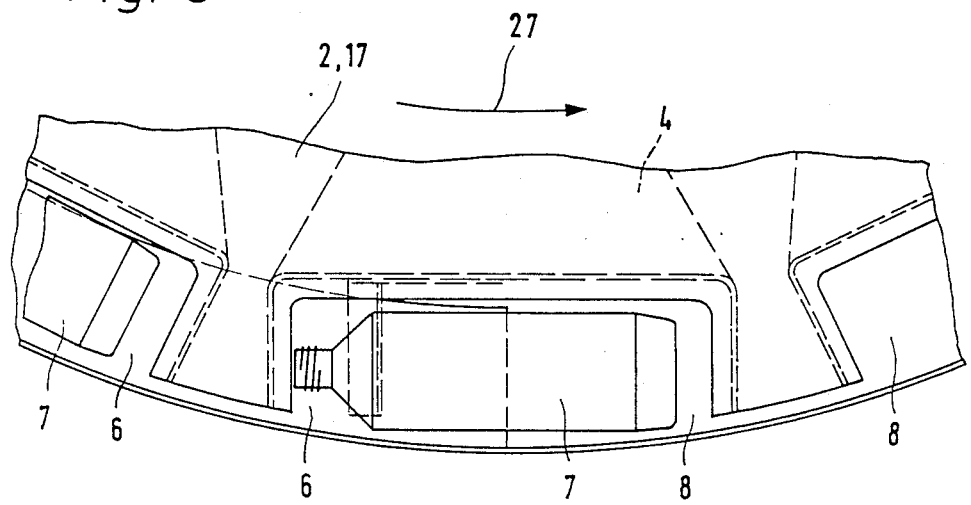
Figure 13:
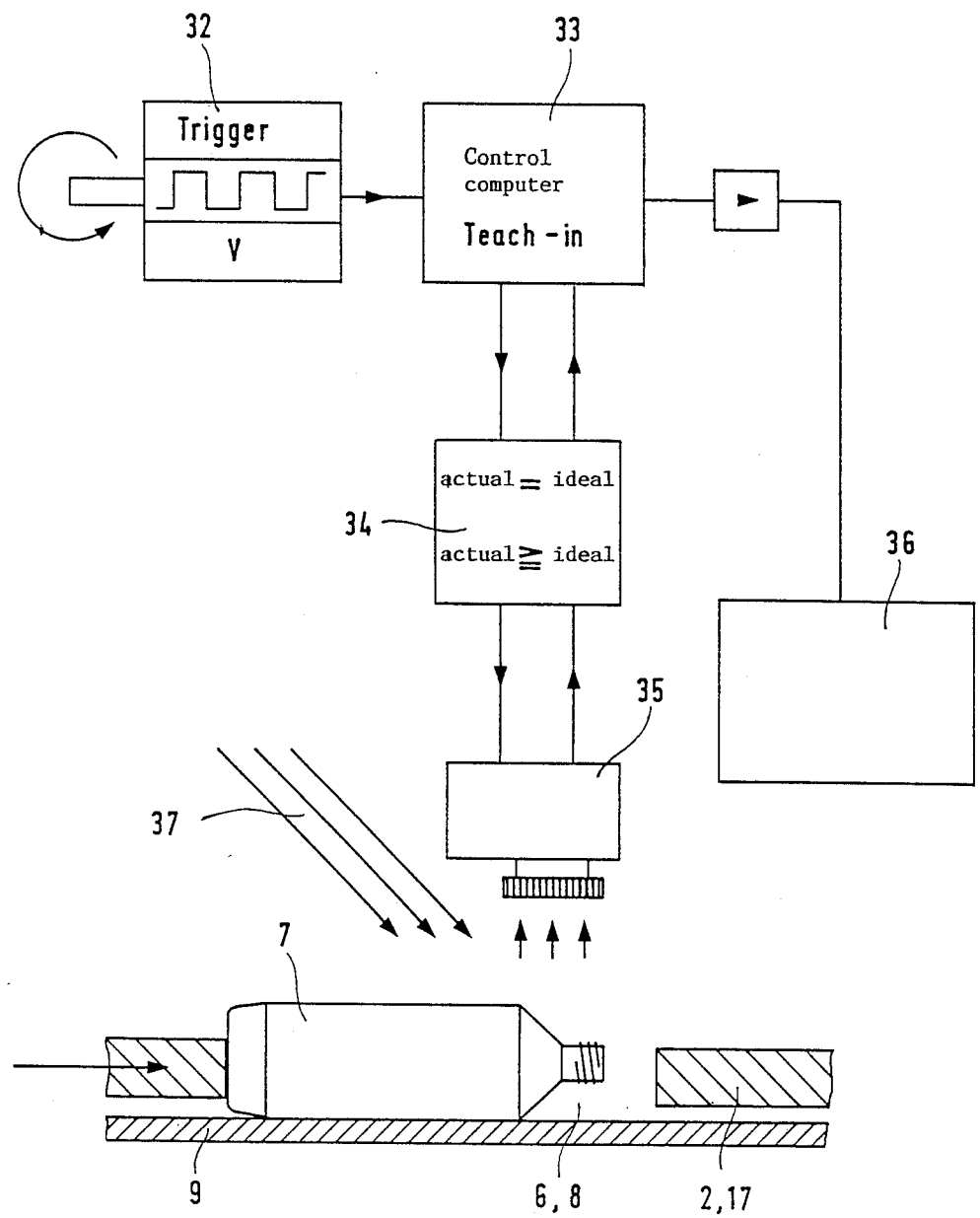
Figure 14:
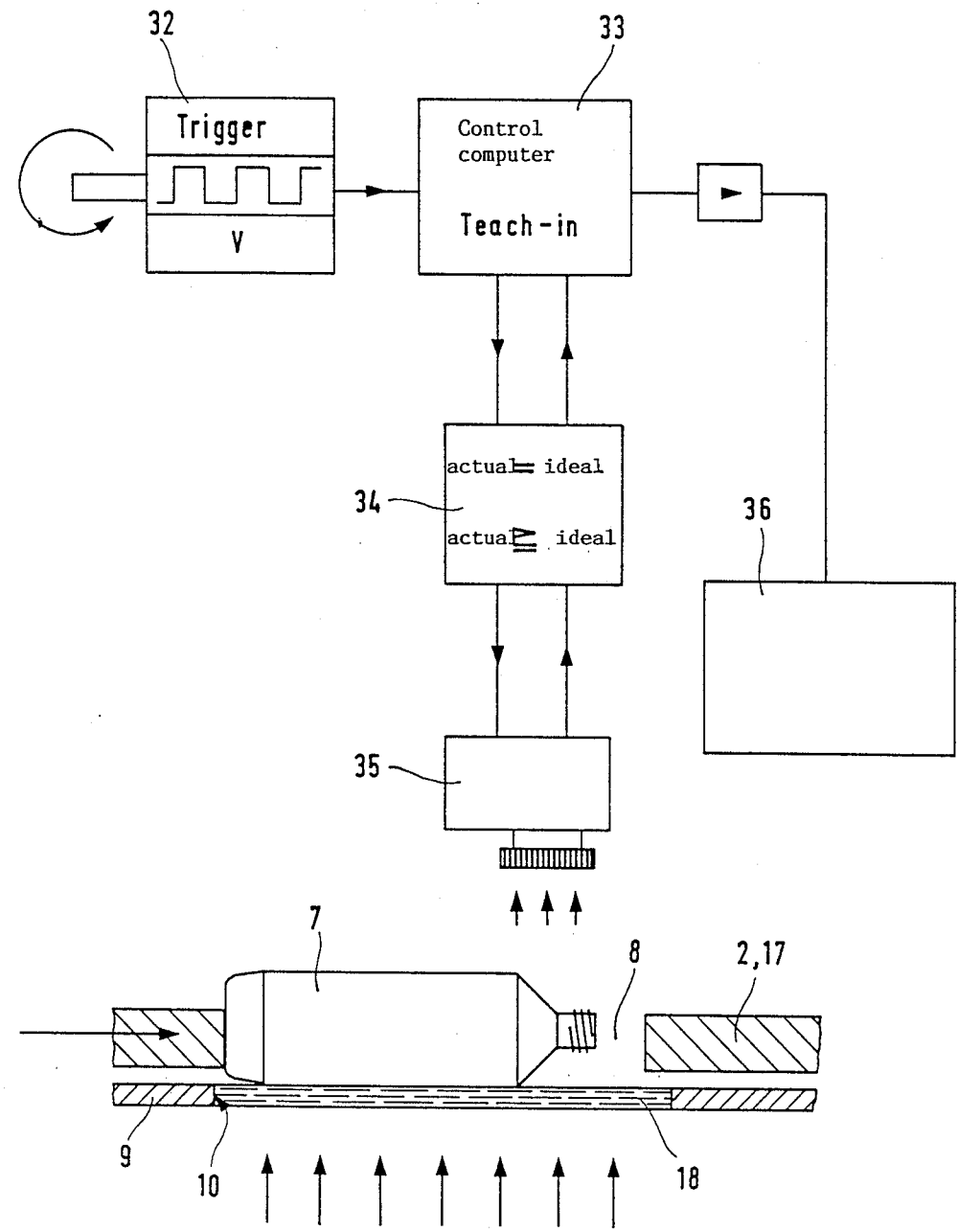

FIG. 1 shows a perspective view of an example of execution of such an apparatus, FIG. 2 a longitudinal section through such an apparatus, FIG. 3 a plan view of the apparatus, FIG. 4 a partial section through the apparatus with the fixed stop roll, FIG. 5 a partial section through the apparatus with the controllable stop roll, FIG. 6 a partial section through the turntable with the fall shaft arranged under it in the uppermost position of the revolution path, FIG. 7 a ground plan of FIG. 6, FIGS. 8 and 9 show corresponding representations according to FIGS. 6 and 7, with shaped part reversed, FIG. 10 shows a side view of a segment with the fall shaft in section, FIG. 11 a partial front view of the segment, FIG. 12 a plan view of such a segment, FIG. 13 a block circuit diagram for the form of execution of an electronic control system at a first identification point and FIG. 14 the control system at another identification point.

The overall structure of the apparatus is yielded especially from FIGS. 1 to 3. The apparatus has, in particular, a circular obliquely set rotating turntable 2, which is mounted on a shaft 11 inclined to the vertical. On the circumference of the turntable 2 there are arranged individual ring segments 17, these ring segments being provided on the outer edge with rectangular passage openings 8, which are provided as reclining places 6 for the shaped parts 7 to be transported. The longitudinal extent of these passages 8 occurs in tangential direction to the turntable 2. Underneath the turntable 2 there is a circular underlayer rotating together with this, which stands out in an annular zone 22 at the circumference of the turntable 2 and on which the ring segments 17 are partially supported. On the ring segments 17 there are arranged, in each case in the zone of a passage opening 8, fall shafts 4 (chutes), which present a U-shaped cross section and have two lateral walls 23 and a back wall 12 directed to the shaft 11. These fall shafts 4 narrow downward, which is to be perceived, for example, in FIGS. 3, 6, 8 and 11. The turntable 2, together with the ring segments 17, is arranged inside a housing 3 which is constructed cylindrical above the turntable 2 and runs in funnel-form underneath the turntable 2. In the border zone of the ring segments 17 there is present underneath the passage openings 8 a fixed floor 9 mounted on the housing 3, which floor extends about to the uppermost point 10 of the revolution path and there presents an interruption 18 for the passage of the shaped parts (FIGS. 6 to 9 and FIG. 14). In the region of the uppermost point 10 of the revolution path the fall shafts 4 are arranged vertically and the shaped parts 8 are transferred in this vertical position to a transport device 1. The housing 3 is provided with a floor 24 which simultaneously bounds the fall shafts 4.

The individual shaped parts 7 are transported from the lowest point of the apparatus arranged in their reclining places 6 to the uppermost point 10 of the revolution path. Here, care must be taken that the shaped parts pass into the fall shaft in such a way that the filling opening of the shaped part 7 is situated at the top. For this, there is allocated to each fall shaft 4 a special baffle plate 5, which in the example of execution represented in the drawings consists of an L-shaped lever which has an elonged arm 25 running downward and a finger 26 reaching transversely over the opening 8. The formation of the baffle plate 5 is recognizable especially from FIGS. 4 to 9. At the longer end of the elongated arm 25 there is provided a pivot axis 19, which is borne on the back wall 12 of the fall shaft 4. The bearing is located in the lower zone of the fall shaft and about in the middle (FIGS. 6 and 8). At the end of the pivot axle 19 there is provided a pin 20 running transversely to the axial direction. By stops 21, which are provided in the form of pins mounted on the back wall 12, the two end positions of the lever 5 are bounded. For adaptation to different-sized shaped parts 7 in the reclining places 6 the swinging angle of the baffle plate 5, and therewith the position of the finger 26, is adjustable. This can be accomplished, for example, by inserting the pins 21 in other places of the back wall 12. If, for example, the opening of the shaped part 7 as seen in runing direction 27 is in front (FIGS. 6 and 7), then the lever 5 is swung forward, so that the opening of the shaped part 7 can abut on the finger 26. If, however, the opening is arranged counter to the running direction 27 (FIGS. 8 and 9), then the lever 5 is swung in the opposite direction, so that here, too, the opening of the shaped part is supported on the finger 26 and the shaped part can pass correspondingly into the fall shaft 4. The control of the movement occurs by a fixed stop roll 13 and a controllable stop roll 14. The fixed stop roll 13 is located on the revolution path after the ejection of the shaped part 7, in the drawing about in the zone of the lowest point of the revolution path behind the back wall 12 of the fall shafts 4 and is fastened to a support 28, for example on the floor 24 of the housing 3. On this fixed stop roll 13 the levers 5 are aligned fundamentally in one direction. For the identification of the position of the shaped parts 7 there is present, in the zone of the revolution path in the direction of the uppermost curve point 10, i.e. in a position in which the shaped parts 7 are singled, an optical or electronic arrangement 15. In this position or, as seen in running position, after it, but before the interruption 18 of the floor 9, there is present the controllable stop roll 14 (FIG. 5), which is likewise mounted on a support 28. The controllable stop roll 14 is mounted on a pneumatic cylinder 29, which is controlled in dependence on the position of the shaped part 7 in its reclining place and on the position of the lever 5.

FIGS. 10 to 12 show the construction of the ring segment 17, in which on this ring segment, corresponding to the passage openings 8, there are arranged fall shafts 4, as well as individual insertion shoes 30, with which the ring segment 17 is thrust over the border zone 22 of the circular underlayer 16. The ring segments 17 are emplaced on the circular underlayer 16 and screwed with connecting plates 31 between adjacent segments 17.

In FIGS. 13 and 14 there is represented the control arrangement which operates the stop roll 14. The control arrangement has a trigger unit 32 which as synchronization element is responsible for the speed of the turntable, for the position of the bottles in the turntable, for an aimed light-source control, as well as for the control appropriate to the position and to the speed of the mechanical system and of the time point of the comparative process in the electronic control system. The control logic 33 arranged on the outlet side appraises the information data obtained from the comparison apparatus 34 arranged on the outlet side and the optical recognition (identification) system 35 under comparison with the ideal, and gives the corresponding signals to a control apparatus 36, which then operates the pneumatic cylinder 29 of the controllable stop roll 14. To the optical recognition system there is allocated a triggered light source 37.

With the aid of the optical or electronic arrangement 15 (FIG. 2), there can be identified the exact position of the shaped part in its reclining place 6 and the stop roll 14 can be correspondingly driven. As optical recognition system there can be provided, for example, a photoelectric cell or a one- or more-line camera (CCD). For the recognition of the position of the containers and shaped parts 7 there can also be used another electronic arrangement, for example an initiator, an ultrasonic device or a laser system.

In the example of execution represented in the drawing there is present as baffle plate 5 a special lever. In place of such a lever there can also be provided a floor divided in the middle of the opening 8. Further, as baffle plate there can be used a retractable floor or bolt.

I claim:

1. An apparatus for orienting randomly oriented oblong bottles and like-shaped objects into upright orientation with a filling end pointing upwardly and followed by delivering the bottles one by one to a horizontal transfer device, and including a housing (3) adapted to receive randomly oriented bottles and having an inclined shaft (11) concentrically and rotatably arranged in the housing; a turntable means (2,16) concentrically fixed to said shaft, said housing enclosing said turntable and having a funnel-shaped lower region; a plurality of spaced openings (6) at the periphery of said turntable means, each opening adapted to receive one of said bottles; a plurality of individual fall shafts (4) aligned with and vertically spaced from said openings, said fall shafts being attached to said turntable means and converging downwardly to a funnel shape to conform with said funnel-shaped lower region of the housing; a fixed floor (9) arranged between said openings and said fall shafts to prevent the bottles from falling through said openings and into the fall shafts, said fixed floor further having a gap in the vicinity of the uppermost point of the revolution path of the turntable to permit the bottles to fall into said fall shafts; the improvement comprising a baffle plate pivotally attached to each fall shaft, said baffle plate comprising a swingable lever (5) and control means (13,14,15) for positioning the lever, depending upon the position of the bottle, to contact the bottle adjacent the filling end, the lever acting as a fulcrum to permit the end opposite the filling end to fall first through said shaft.

2. The apparatus according to claim 1, wherein said control means includes sensing means (15) for determining the position of the bottles and a fixed stop roll (13) for bringing all levers to one predetermined position and a controllable stop wall (14) located diametrically opposite the fixed roll to either leave each said lever in said one predetermined position or to position each said lever in a second predetermined position, depending upon the output of the sensing means.

3. The apparatus according to claim 1, wherein said lever further includes a projecting swinging anxle (19) rotatably attached to a back wall (12) of the fall shaft and a pin (20) running transversely to said swinging axle, said wall having stops (21) attached thereto to engage and limit the pin, said stops determining the position of the lever.

* * * * *